US011161730B1

(12) United States Patent
Volftsun et al.

(10) Patent No.: US 11,161,730 B1
(45) Date of Patent: Nov. 2, 2021

(54) CHILLED BEVERAGE DISPENSING

(71) Applicant: Sestra Systems, Inc., Sterling, VA (US)

(72) Inventors: Lev Volftsun, Sterling, VA (US); Alex Kushnir, Sterling, VA (US)

(73) Assignee: SESTRA SYSTEMS, INC, Sterling, VA (US)

( * ) Notice: Subject to any disclaimer, the term of this patent is extended or adjusted under 35 U.S.C. 154(b) by 0 days.

(21) Appl. No.: 17/072,448

(22) Filed: Oct. 16, 2020

Related U.S. Application Data (63) Continuation-in-part of application No. 14/686,820, filed on Apr. 15, 2015, now Pat. No. 10,125,002, and a continuation-in-part of application No. 16/503,681, filed on Jul. 5, 2019, which is a continuation-in-part of application No. 15/869,028, filed on Jan. 11, 2018, now Pat. No. 10,294,093, and a continuation-in-part of application No. 15/424,478, filed on Feb. 3, 2017, now Pat. No. 10,167,183, and a continuation-in-part of application No. 15/487,488, filed on Apr. 14, 2017, now Pat. No. 9,926,181, which is a continuation-in-part of application No. 15/332,117, filed on Oct. 24, 2016, now Pat. No. 10,294,092.

(60) Provisional application No. 62/961,919, filed on Jan. 16, 2020, provisional application No. 63/029,585, filed on May 25, 2020, provisional application No. 62/695,213, filed on Jul. 9, 2018.

(51) Int. Cl.
*B67D 1/08* (2006.01)
*G06F 3/01* (2006.01)

(52) U.S. Cl.
CPC ......... *B67D 1/0888* (2013.01); *B67D 1/0855* (2013.01); *B67D 1/0857* (2013.01); *G06F 3/017* (2013.01)

(58) Field of Classification Search
CPC .. B67D 1/0888; B67D 1/0857; B67D 1/0855; B67D 13/0003; B67D 1/0037; B67D 3/0077; G06F 3/017; E03C 1/057; F25D 23/126; F25D 23/028; A47K 5/1217
USPC .............................. 222/1, 63, 146.6, 190, 52
See application file for complete search history.

(56) References Cited

U.S. PATENT DOCUMENTS

| | | | |
|---|---|---|---|
| 2014/0110018 A1* | 4/2014 | Scarvelli | B67D 1/0891 141/64 |
| 2017/0254055 A1* | 9/2017 | Xia | E03C 1/18 |
| 2019/0272047 A1* | 9/2019 | Yamada | G06F 3/0386 |

* cited by examiner

*Primary Examiner* — Vishal Pancholi
*Assistant Examiner* — Robert K Nichols, II
(74) *Attorney, Agent, or Firm* — Gugliotta & Gugliotta LPA (57) ABSTRACT

A beverage dispensing system provides a product metering system, a dispenser and a control system for operatively controlling dispensing, metering, delivering and reporting of dispensed product. Authentication, authorization and control operation are distributed in a cloud based control through a wide area network. The dispenser includes sensor to identifying objects and filter out movements that are not interpreted as requests for dispensing. A local controller operates the metering and dispensing, combining inputs from the hardware level sensors and applying logic and rules from the remote cloud level. The instant abstract neither defines the invention disclosed in this specification nor limits the invention scope in any way.

20 Claims, 9 Drawing Sheets

CHILLED BEVERAGE DISPENSING

RELATED APPLICATIONS

There present invention claims the benefit of U.S. Provisional Applications Ser. No. 62/961,919 and Ser. No. 63/029,585, which are incorporated by reference as if fully rewritten herein. Additional applications of related continuity are further disclosed as part of the Application Data Sheet filed pursuant to 37 CFR § 1.76.

BACKGROUND OF THE INVENTION

1. Field of the Invention

The present invention relates generally to refrigerated beverage dispensing systems and, more particularly, to an improved chilled beverage dispensing system.

2. Description of the Related Art

Beverage dispensing systems exist that distribute bulk, keg dispensed beverages such as beer, wine, cold brew coffee or the like through a distribution conduit and to a spigot or tap. For example of such beverage dispensing systems may include those described in U.S. Pat. Nos. 10,125,002 and 10,294,092 were a system and method for the automated dispensing of bulk keg wine is provided having, in combination: integrated temperature control; pressure monitoring; automated purging; and an integrated point of sale data acquisition for determining inventory usage statistics for each keg of wine dispensed.

In conjunction with brewed beverages, devices exist for dispensing refrigerated condiments such as milk, cream and/or milk froth exist. However, such systems and improvements generally provide a Barista with access to dispense such cold liquids as part of the making of a blended drink. In unblended brewed drinks, the current standard for providing milk or cream consists only of providing separate insulated carafes of crème, milk, and half and half at a self-serve location for customer use subsequent to the retrieving and paying for their drink.

However, the recent pandemic disruption has raised concerns over the hygiene and safety within group settings, including public locations where food and/or drink are both dispensed and consumed. In such a new paradigm, even those traditional and long-standing customs and practices are now under hyper-scrutiny for hygiene and pathogen safety.

Consequently, a need exists for providing the dispensing of crème, milk, and half and half in a customer self-serve manner in combination with touchless beverage dispensing utilizing non-contact sensors and in a manner of actuation that eliminates accidental beverage dispensing.

SUMMARY OF THE INVENTION

It is thus an object of the present invention to provide an improved chilled tap tower for use with semi-automated or automated beverage dispensing systems.

It is still a feature of the present invention to provide for closed loop cooling within the beverage delivery conduit and tap tower that chills the volumes of beverages located inside of a tap tower to prevent it from warming between servings.

An objective of the system is to circulate water (or other liquid) with a temperature equal to the temperature inside the refrigerator through the tap tower and for keeping the temperature of the beverage in the lines/tubes/etc. going to through the tower to the dispensing point at the same temperature. Water or liquid is circulating in a loop combined with beverage delivery tubes in an insulated conduit to the dispensing faucets for beverage. The water or chilling liquid is circulating at high speed (e.g., up to around 1,500 liters/hour) to keep conduit and beverage cold.

The present invention provides a beverage dispensing system incorporating an improved chilled tap tower. The beverage dispensing system provides a beverage pour control system for dispensing and metering chilled beverages including a system that chills the relatively small volumes of beverage located inside of a tap tower which would otherwise get warm or even hot between servings. The present improvement augments existing chilling systems and will work with any type of beverage dispenser, whether using flow meters or a time-based metering, and chills the dwell volume of beverages located inside of a tap tower that can get warm or even hot between servings.

According to one aspect of the present invention, a touchless dispensing tap is supported on a tap tower in fluid communication with and for the dispensing of the beverage fluid. Two (or more) sensors operating simultaneously are used to identify a dispensing request from a touchless dispenser. A tap tower includes a spigot and at least one non-contact sensor affixed to or within the body of the tap tower. The sensor is adapted to identifying objects and is further adapted to filter out movements that are not interpreted as a request for dispensing. A microprocessor analyzing the data from the non-contact sensor determines when an actual request for dispensing is received. Once the request for dispensing is confirmed the spigot operationally delivers a redetermined volume of the beverage.

According to another aspect of the present invention, a temperature control system maintains the bulk beverage volume, and a closed loop cooling circuit provides chilling to the tap dwell volume utilizing a pump, a discharge conduit, a return conduit, and a heat exchanger all in continuous operational fluid communication. The pump includes a hydraulic reservoir integrated within the pump to provide for continuous priming and suction to facilitate pumping coolant through at least one heat exchange assembly. The heat exchanger utilizes a cooling radiator utilizing a food grade propylene glycol as a cooling fluid with the closed loop.

According to another aspect of the present invention, a close system recirculating pump is utilized. Such a pump may be of the type originally designed for CPU cooling in powerful computer systems. Such pumps are very small and designed to operated 5-years plus of continuous operation. The pumps are also of a small form factor (i.e., typically approximately 3"×5"×5"), and are fully sealed so as to operate in moist air (i.e., inside a refrigerator). Such pumps circulate a food-grade cooling fluid through a slim radiator style heat exchanger that allows the fluid to be chilled effectively using cold air inside a refrigerator to bring the tap dwell volume to the same temperature of the refrigerator.

According to one aspect of the present invention, operation of the non-contact sensor provides both sending a pulsed signal and receiving the pulsed signal reflected from an object located in the path of the emitted signal. The microprocessor measures the time that elapses between initiation of the pulse and receipt of the reflection and uses this time delay to calculate the distance between the non-contact sensor and the object.

According to another aspect of the present invention, the pulsed signal may consist of high frequency ultrasound pulses. According to other aspects of the present invention, the pulsed signals may be infrared or electromagnetic radiation.

In order to differentiate between a valid request for dispensing and other activity in the vicinity of the touchless dispenser, a target area is identified where potential requests for dispensing are considered. Movements of a targeted object within the target detection area are then detected and the amount of time is calculated where the targeted object spends inside the detection area. Detection of the targeted object in a stable position within the detection zone for a predetermined amount of time can then be used to trigger the dispenser.

In accordance with an additional aspect of the present invention, an additional downwardly directed sensor may be optionally incorporated for verifying actual flow being dispensed. Such a sensor orientation may also be adapted to verify the level of fluid within a user's cup or mug.

It is an advantage of the present invention to allow for the non-contact dispensing of a beverage or the like in order to improve hygienic operation.

It is another advantage of the present invention to filter out and not react to such activities as people walking or standing in a close proximity to the station, waiving their hands or placing objects on the bar where a beverage dispenser is located. As such, activities such as cleaning of faucets or other activities performed by the staff do not trigger an unintentional dispensing of beverages.

Additionally, it is anticipated that the present invention may be adapted for both beverages as well as other non-Newtonian fluid foodstuffs (i.e., catsup, mayonnaise, other condiments).

Improvements so provided allow for the cooling of tap towers within a desired temperature range applicable to the beverage being delivered that minimize space and weight.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The main challenges in providing a touchless beverage dispensing of chilled beverages are two-fold: utilizing non-contact sensors for actuation is the elimination of accidental beverage dispensing; and, preventing spoilage in the volumes between bulk refrigeration and tap dispensing. In reference to the first problem, such a dispensing system must always be monitoring sufficiently to identify a request from a non-request motion. In reference to the second problem, an additional subset of the problem may further include preventing material accumulation about a discharge nozzle that can collect bacteria that would lead to spoilage.

In monitoring for motions that can be differentiated between affirmative requests and errant motions, the system should be able to filter out and not react to such activities as people walking or standing in a close proximity to the station, waiving their hands or placing objects on the location where a beverage dispenser is located. In addition, cleaning of faucets, beverage dispensers, and the bar itself performed by the staff should not trigger an unintentional dispensing of beverages.

Some methods and devices are known that incorporate various mechanisms for proximity sensing for beverage dispensing. Of particular example is U.S. Pat. No. 9,809,439 entitled "SANITARY TOUCH—FREE AUTOMATIC CONDIMENT DISPENSING. While such a reference teaches rudimentary operation for the dispensing of condiments in a non-contact manner, the present invention includes some significant differences that can aid decreasing unintentional dispensing. By way of example, the '439 reference utilizes IR sensors, but requires multiple sensor inputs for purposes of triangulation of a container target. Other types of noncontact sensors (i.e., Time of Flight, LiDAR, optical/camera, etc.). Further, a two-tier valve system is used for both condiment and a propellant for providing an urging force to dispense the condiment. However, such triangulation requires precise measurements of angles which is not practical or maybe even possible in case of beverage dispensers in commercial hospitality settings. Further, a tiered valve system creates additional complexity in cost and operation and addition of potential points of failure during operation.

It the present invention is preferable that a non-contact sensor actuated beverage dispensing systems be adapted and configured for the identification of specific hand gestures, rather than merely the blunt sensing of any object within a detection zone. Rather than using multi-sensor triangulations it would be preferred to calculate distances to objects using ultrasonic sensors and analyzing reflected pulses. The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Various other algorithms may be utilized for different combinations of sensors to be used in order to eliminate accidental dispensing from surrounding foot traffic, people gatherings, cleaning and other activities that could trigger unnecessary dispensing.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

1. Detailed Description of the Figures

Referring now to the drawings, wherein like reference numerals indicate the same parts throughout the several views, a beverage dispensing systems, generally noted as 10, having improved chilled tap tower 40 for use therewith is shown according to a preferred embodiment of the present invention. The system 10 consists essentially of: a containment housing 20; a temperature control system 30; and a tap dispensing tower 50.

The containment housing 20 may be of a variety of sizes and configurations, including portable or fixed position embodiments. The housing 20 may further be adapted from an otherwise conventional refrigerator appliance and adapted to a fixed counter or portable cart. As should become apparent to those having ordinary skill in the relevant art, in light of the present teachings, those portable configurations, as well as some small form factor fixed configurations, would comprise those systems having the most to gain from an optimized form factor and minimized weight and space requirements. The containment housing 20 may include at least the temperature control system 30 that is operatively controlled from a temperature sensor 32. The temperature control system 30 may include a heat exchange radiator 33 and provide a cold space 34 for receiving a bulk supply container 36, shown herein as a milk container. In an exemplary alternate configuration, the system 10 may be adapted for dispensing of beer, wine or similar beverage, as described in greater detail below. In addition to cooling the cold space 34, the system 30 may include a glycol recirculation pump 38 for circulation of refrigerant through a glycol circulation loop 40. A flow detector 42 may be provided to provide a flow detection input to the local system controller 60. The circulation loop 40 is in thermal communication between the cold space 34 and the tap dispensing tower 60. By monitoring the flow of cooling from the flow sensor 42, as well as the temperature of the cold space 34 from the temperature sensor 32, the controller 60 may detect when the refrigeration has been halted, or the coldspace exceeds the needed specification for a period of time, or other control logic to prevent dispensing when product safety can be questioned.

Figure 1:
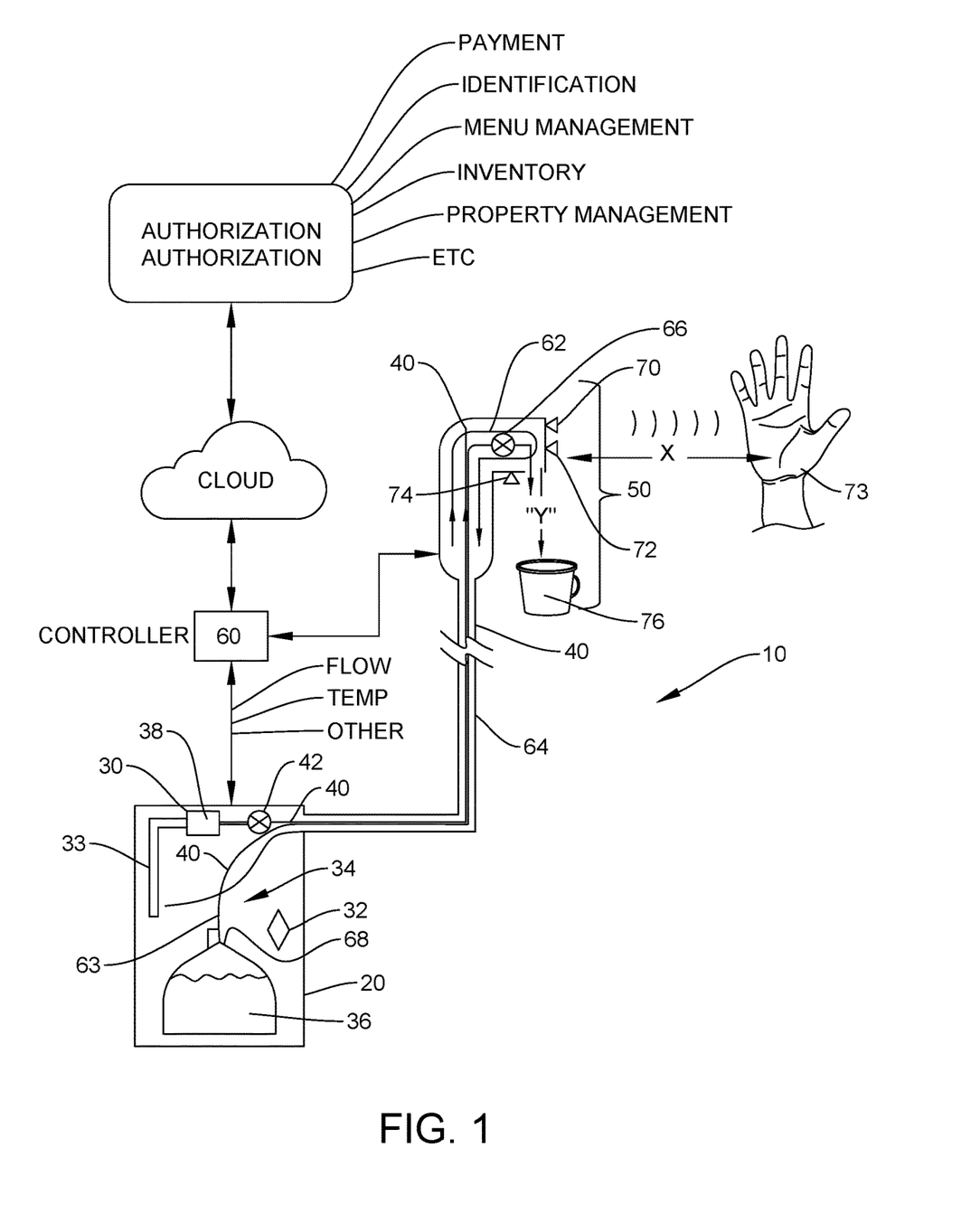
FIG. 1 is a schematic representation of a beverage dispensing system including an improved chilled tap tower according to a preferred embodiment of the present invention.
Figure 2:
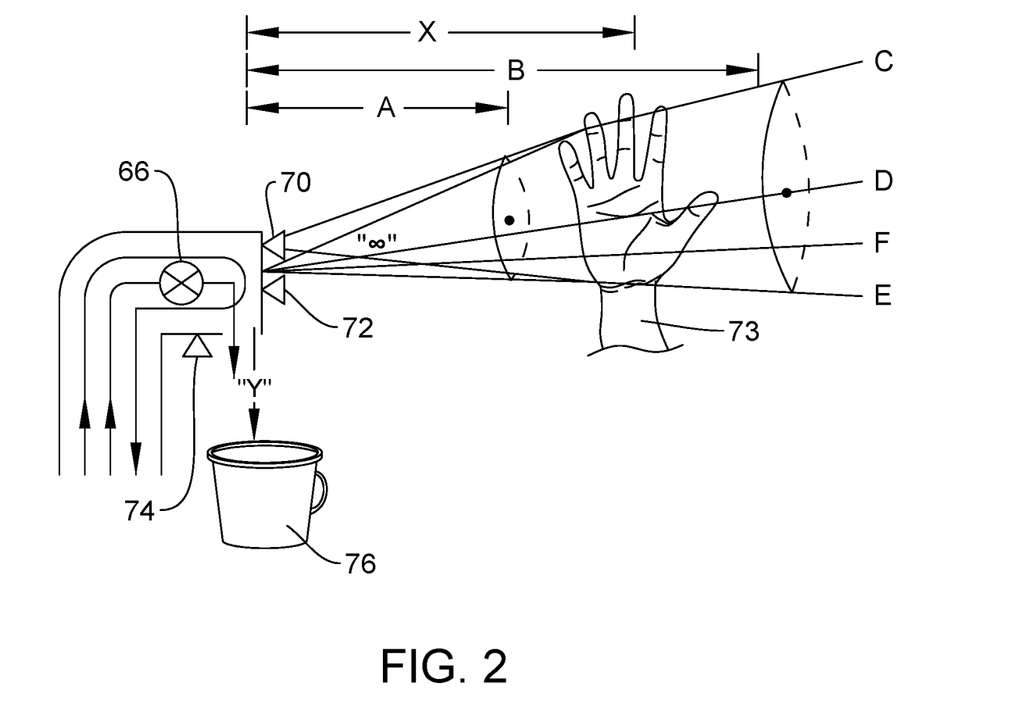
FIG. 2 is schematic representation of an improved system for actuating a touchless dispensing system for use in accordance with a preferred embodiment of the present invention.

As shown best in conjunction with FIG. 1-2, the temperature control system 30 is shown illustrating a preferred closed loop cooling system. As schematically illustrated a closed loop cooling approach is provided utilizing the recirculation pump 38 that circulates coolant through a discharge conduit, a return conduit, and a heat exchanger 33. The pump 38 is preferably a reservoir pump in which a hydraulic reservoir is integrated within the pump to provide for continuous priming and suction. In a preferred embodiment the pump 38 may include any of the following:

- EK® Water Blocks model EKWB EK-XRES 140 Revo D5 RGB PWM Reservoir with Pump (available from EKWB d.o.o. of Komenda, Slovenia)
- EK® Water Blocks model EKWB EK-DBAY D5 PWM MX Liquid Cooling Reservoir with Integrated Water Pump
- EK® Water Blocks model EK-XTOP Revo D5 PWM Plexi Pump
- Swiftech® MCP655-B 12 Volts Industrial Pump (available from Rouchon Industries, Inc DBA Swiftech Corp. of Pico Rivera, Calif.)

Such pump selections have been shown to be functionally effective in the intended application, but such particular selections should be considered exemplary of any such pump that is functionally similar to or equivalent thereof.

The discharge conduit distributes pressurized fluid such as water or food grade glycol in a manner that parallels the distribution of the discharge conduit 62 between the bulk container 36 and the tap tower 40. The food grade glycol may be a propylene glycol USP Kosher Certified food and pharmaceutical grade such as that provided by Froggy's Fog Brand item CHEM-PG-1G-A as available from Froggy's Fog LLC of Columbia Tenn., or any functionally similar or equivalent materials. As should be apparent to one having ordinary skill in the relevant art, the dispensing conduit 62 and discharge conduit may be routed in conjunction with one another within an insulated conduit 64. Similarly, the return conduit may be provided as a return loop within the tap tower 40 and also be routed within the insulated conduit 64. Such a configuration provides for the maintenance of cooling of beverages within the discharge conduit and through a spigot while dwelling within the tap tower 40. Of particular significance is the ability to provide for sufficient cooling within the tap tower 40 during long periods of dwell time, such as an extended time between pours from the spigot (e.g., throughout extended down time that may occur during off hours).

The return conduit is thereby routed to an input of the heat exchanger 33. The heat exchanger 33 is preferably a modular cooling unit such as:

- Corsair® Hydro XR5 Triple 360 mm Water-Cooling Radiator;
- Corsair® Hydro XR5 Dual 240 mm Water-Cooling Radiator; or
- Corsair® Hydro XR5 Single 120 mm Water-Cooling Radiator as available from Corsair Components, Inc. of Fremont, Calif., or any functionally similar or equivalent materials.

The discharge of the heat exchanger 33 is in fluid communication with the inlet of the pump 38, thereby closing the hydraulic loop. Such Corsair® XR5 series water cooling radiators are conventionally designed and configured for rapid and custom cooling in computer, server and microprocessor applications to deliver high heat flux cooling performance with high-airflow or low-noise fans. However, in such conventionally applications such heat exchanger is provided to remove the heat generated within a container. In contrast, the present application provides and improvement to augment existing refrigerator systems and will work with any type of beverage dispenser, whether using flow meters or a time-based metering, in order to chill the dwell volume of beverages located inside of a tap tower that can get warm or even hot between servings. As such, the cooling radiator herein is intended to remove heat flux that is generated from outside the tap tower 40 and migrating inward.

The tap dispensing tower 60 and the containment housing 20 may be in close physical proximity, or place at a larger distance between the two depending upon the user's need. It should be apparent to those having ordinary skill in the relevant art, in light of the present teachings, that the present invention may be adaptable to either arrangement with a beverage dispensing line 62 spanning between the cold space 34 and tap tower 50 within a fully refrigerated conduit 64 that is in fluid communication between the cold space 34 and the tap tower 50.

The tap tower 50 provides a dispensing point for delivering the requested beverage. A pump 66 may be provided in communication with the bulk supply container 36 through the beverage dispensing line 63. The pump 38 may be of a diaphragm pump, a peristaltic pump design or other similar or functional equivalent pump type. A seal or adapter 68 may be provided between the dispensing line 62 and the bulk container 36 in order to accommodate for differences in form factor.

The tap tower 50 may further support a plurality of dispensing control sensors. As shown in conjunction with FIG. 2, at least one proximity sensor 70 may be provided in a user facing orientation. The sensor 70 may operate by sending high frequency ultrasound pulses and then receiving the pulses reflecting from objects located in the path of the emitted signal. By measuring the time that elapses between the moments when a pulse is sent and its reflection is received, the controller 50 can calculate distance "X" between sensor 70 and an object 72, such as a user's hand. It should be noted that not only ultrasound, but other types of proximity sensors may be utilized including, inter alia, infrared or electromagnetic sensors or those having functional equivalent operation. It should also be noted that multiple proximity sensors 72 may be attached to each tap in order to increase the accuracy of object detection.

The tap tower 50 may further support a stream detection sensor 74. The stream dispensing sensor may downward face so as to identify the target area where potential requests for dispensing are considered, shown herein as a drinking vessel 76. The stream dispensing sensor 74 may specifically be used to verify the dispensing of a requested volume of beverage. The target sensors 70, 72 form a three-dimensional target area represented by a truncated cone such that a distance "X" between the sensors 70, 72 and targeted object 76 satisfies the condition $A \leq X \leq B$, wherein the angle between cone's axis and its slanted heights defines the width of a cone. The sensors 70, 72 may also identify movements of an object within the target detection area, an amount of time an object spends inside the detection area, and a stability of the position of the object 76.

The objective of the dispensing algorithm is to differentiate between valid requests for beverage dispensing and any other activity in the vicinity of the dispensing station. The behavior of the algorithm is controlled by a number of parameters, including but not limited to the following:

Distances A and B are the closest and the farthest distances between the sensor and an object that define the three-dimensional area where object's presence could initiate beverage dispensing.

The time interval between two consecutive pulses emitted by the proximity sensor(s) 70,72. For each emitted pulse the controller 60 checks whether a foreign object is present in the cone C-D-E (sensor sensitivity cone) at a distance between A and B.

After a selected number of consecutive measurements indicate a presence of an object close to the sensor for detection period $T = t \times N$, the decision is made that a guest has requested a serving of a beverage.

As an example, setting A=5 cm, B=15 cm, t=250 millisecond, and N=4, if an object is present inside the sensor sensitivity cone and the distance between 5 and 15 cm from the sensor for T=1 second, it is assumed that user requested to initiate dispensing of a beverage.

In addition, the position of the object relative to the sensor must be stable, during the detection period T the distance X should not change more than a desired distance percent (e.g., 10%).

Parameters N and P may further be utilized for the elimination of false positive errors in identifying beverage dispensing requests. If a person just passes by or waves their hand unintentionally in front of the tap tower it should not trigger beverage dispensing.

Axis D of sensor sensitivity cone shown at an angle with the dotted line F that represents a horizontal line. This upwards orientation of axis D is intended to minimize false positive errors.

The pump 66 may operate to dispense a predefined fixed volume of a beverage or, alternatively, it can continuously pour for as long as object 76 is identified by the proximity sensor 70, 72. As soon as this object 76 is moved away from the sensor 70, 72, pouring may stop. It should be pointed out that the instant invention may also work for tap towers containing several individual taps. In such an alternate configuration, each successive tap will require a proximity sensor installed next to it. In such multiple use configurations individual sensitivity cones of each of the sensors should not overlap.

As described above such a system 10 may be well adapted for providing crème, milk or half and half from bulk containers to a customer's coffee (i.e., 76). As indicated above, the cold space 34 may receive and store at least one bulk beverage keg of beer, wine, or other beverage. For use with beer, the cold space 34 may be sized for containing one or more of any of such typical commercial size bulk beverage kegs. Alternately, for use with commercial style wine kegs the cold space 34 may contain one or more of such typical wine kegs including, but not limited to, those lightweight one-way kegs known as the KeyKeg® by Eurokeg B.V. of the Netherlands utilizing a cylindrical 30-litre keg for dispensing wines in a manner that can keep for weeks after initial broaching of the container.

When used with carbonated beverages such as beer, the detection of an empty keg may further be identified during dispensing. A system for dispensing carbonated beverages from a keg containing a carbonated alcoholic beverage that is pressurized by a pressurized tank of gas includes a first delivery line for communicating the carbonated alcoholic beverage to a Foam on Beer (FOB) detector. The FOB forms a reservoir or chamber into which the liquid is dispensed and containing a float. A level detector in operative communication with the float identifies a level of said float. An empty keg is identified when the float level within the FOB moves downward. Upward movement of the float indicates when a new keg is implemented.

2. Operation of the Preferred Embodiment

Figure 3:
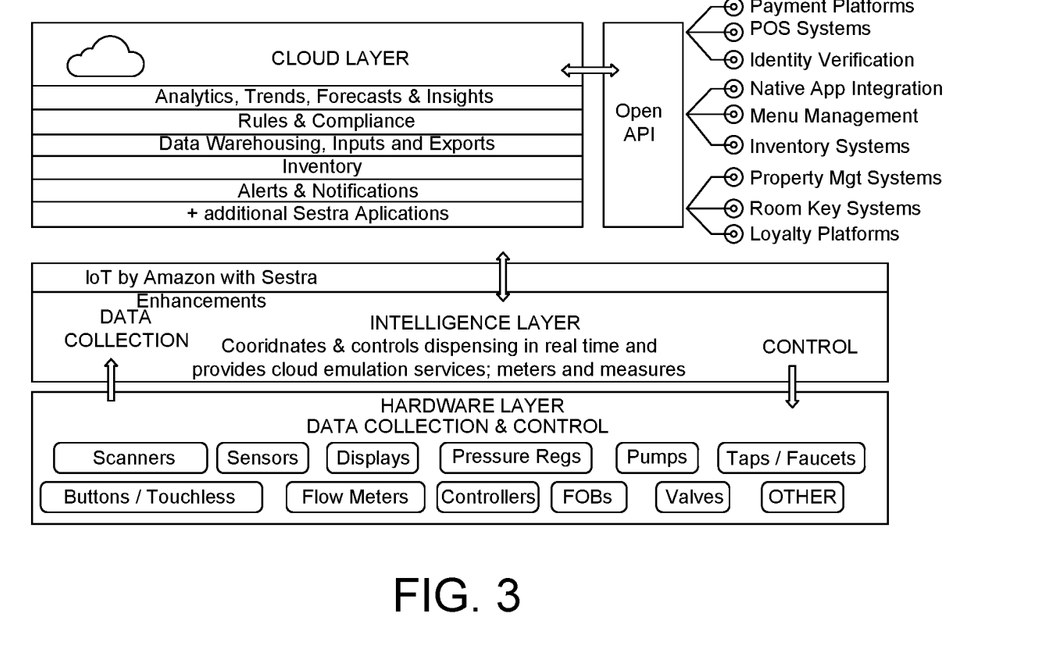
FIG. 3 is a schematic of the control heirarcy for use therewith.
Figure 4:
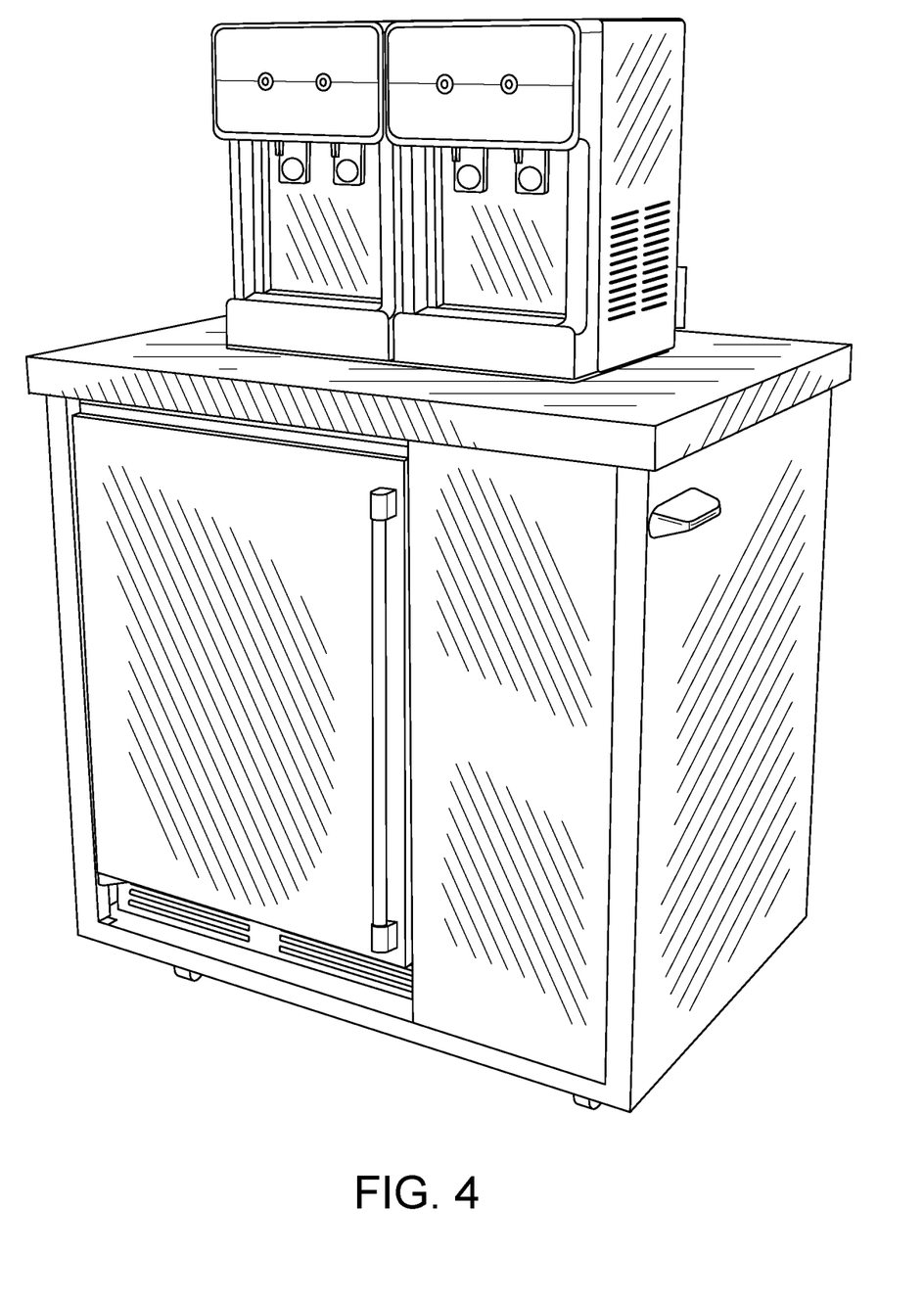
FIG. 4 is a photograph of prototype finished cart incorporating the teachings of the present invention showing a dispensing block on tope insulated and with multiple sensors and dispensing nozzle.
Figure 5:
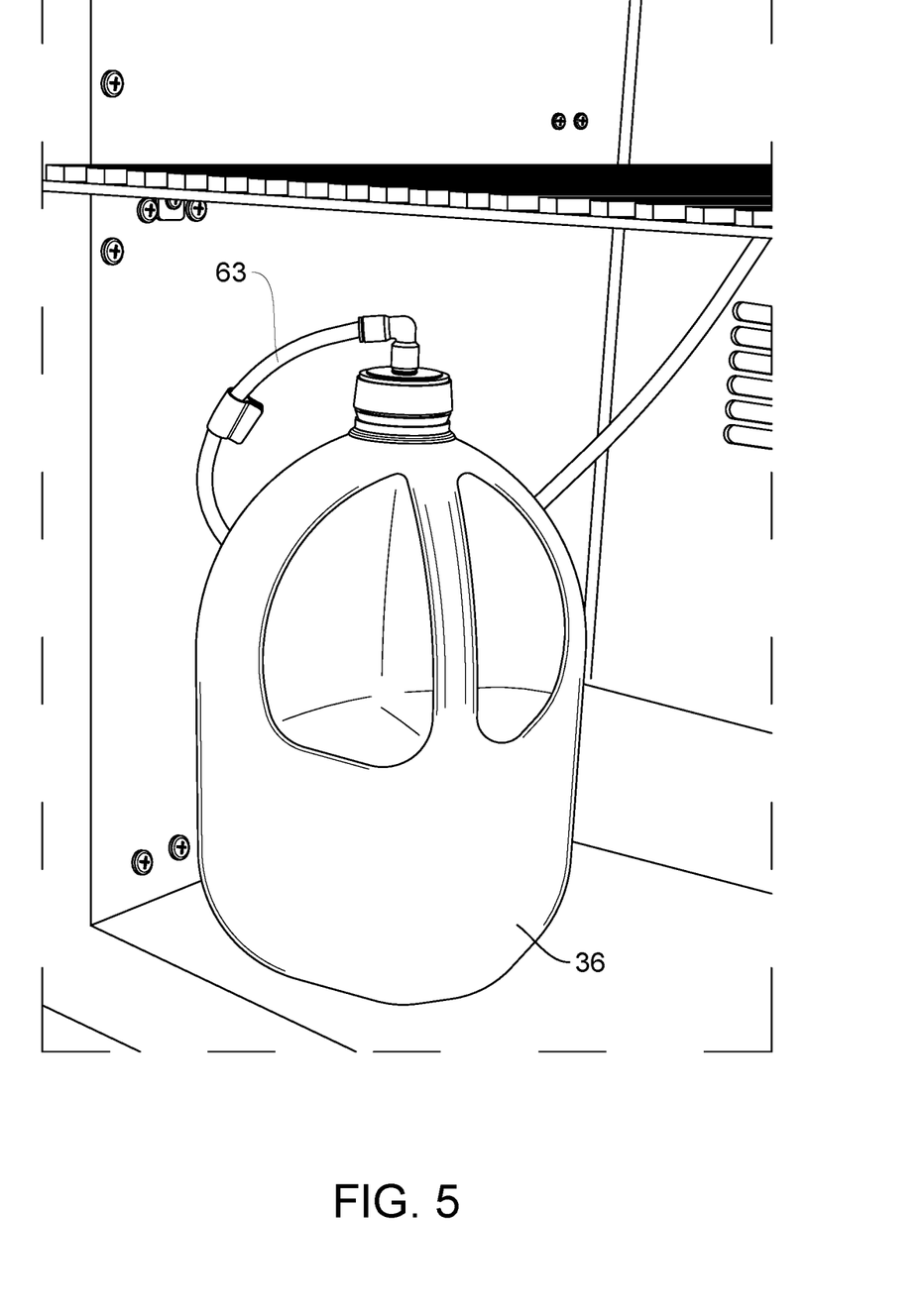
FIG. 5 is a photograph cold space 34, showing a jug of milk 36 therein with the dispensing tubing 62 discharged therefrom.
Figure 6:
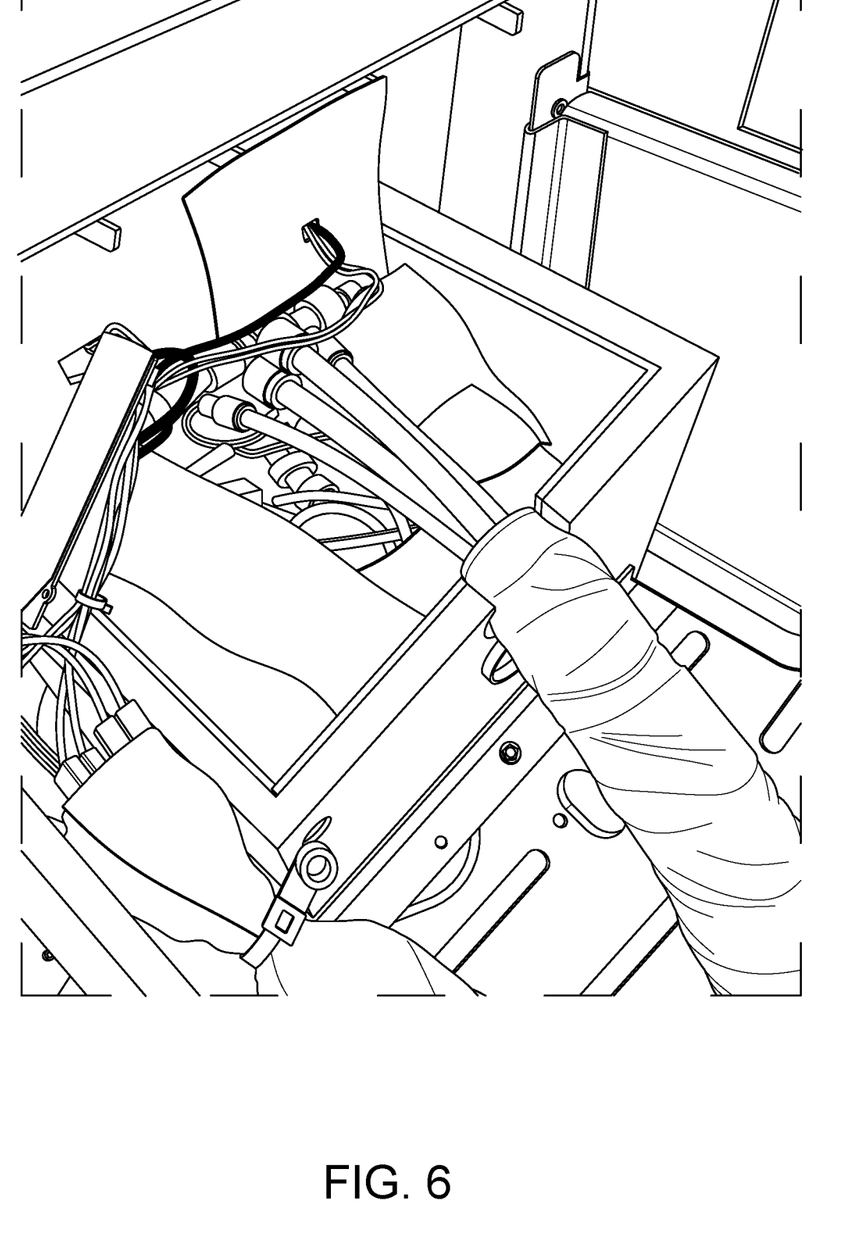
FIG. 6 is a photograph of a tap dispensing tower 50 with the pump 66 with white tube supplying milk and red stripe tube circulating glycol and control wires for the pump and for the sensors with insulated conduit from refrigerator with milk and glycol tubes.
Figure 7:
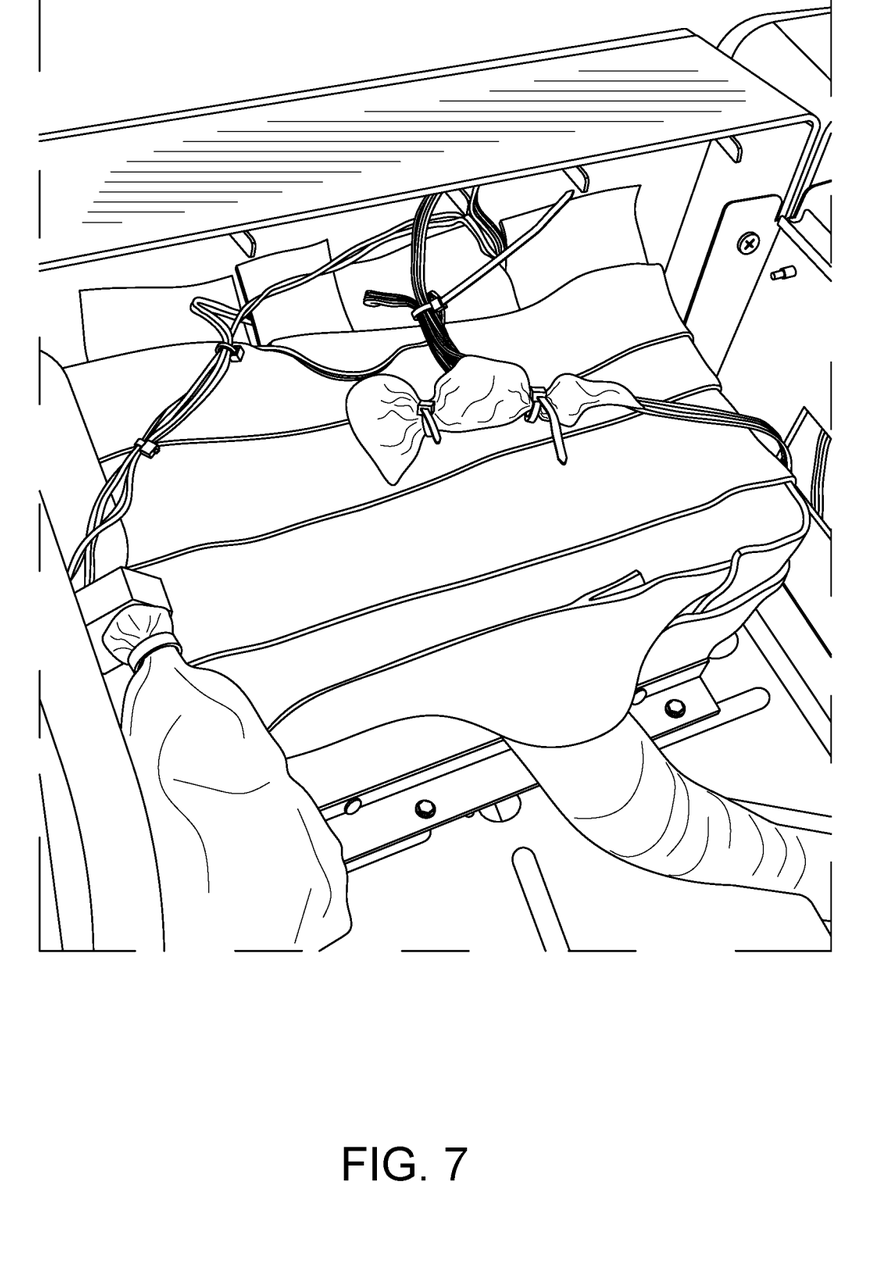
FIG. 7 is a photograph of a fully insulated dispensing block for use therewith.
Figure 8:
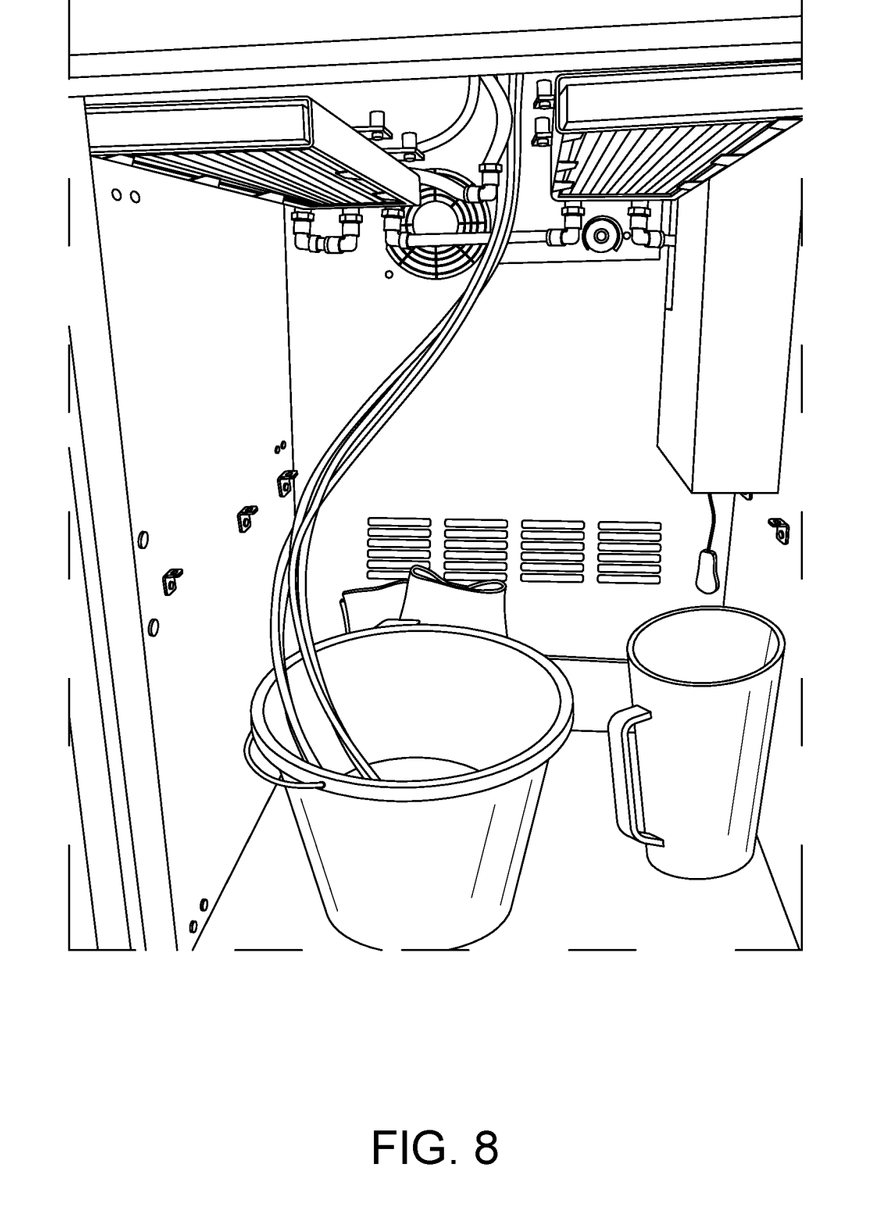
FIG. 8 is a photograph of the inside of the cold space 36 with radiators 33 for heat exchange and recirculating pump 38 with tubing combined in the conduit with milk lines and glycol cooling lines going to dispensing block.
Figure 9:
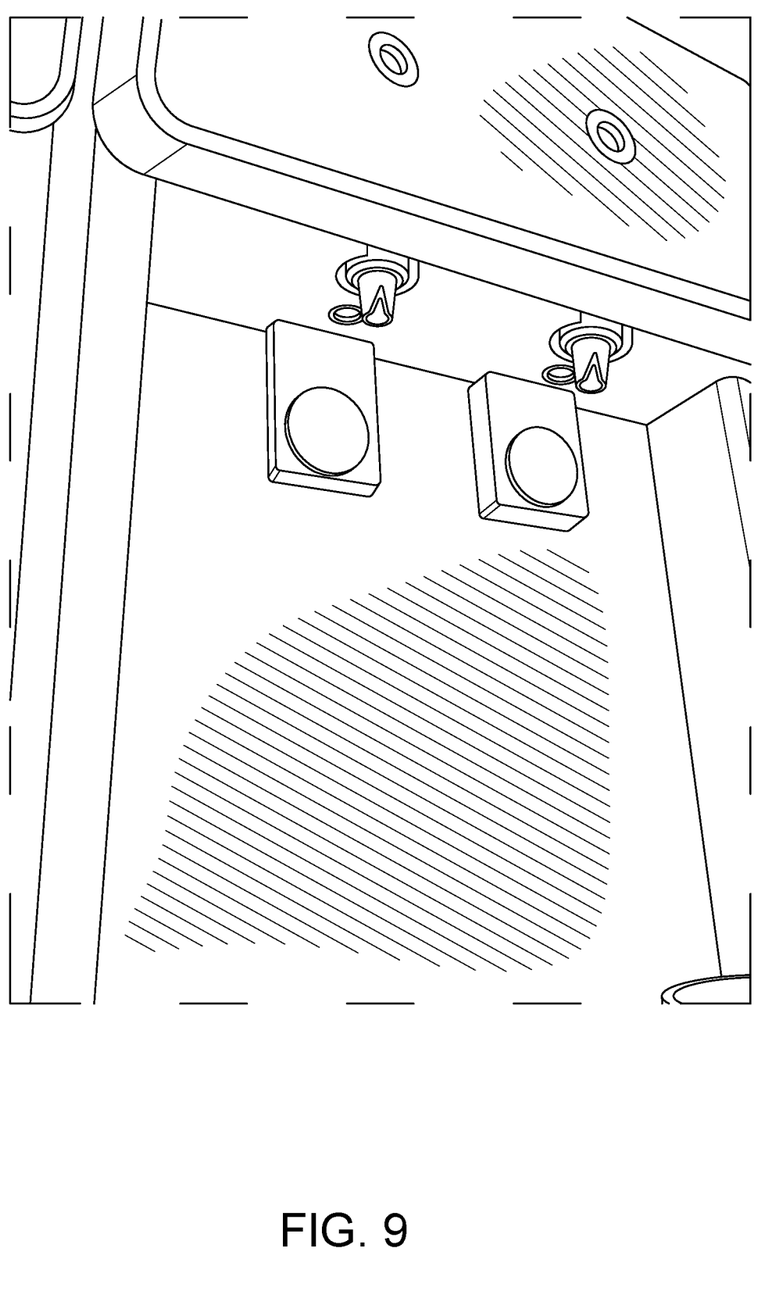
FIG. 9 is a photograph showing the dispensing nozzle and sensors, one sensor 70 behind the nozzle and one sensor 72 looking for gestures (note: in this prototype implementation the sensor detecting actual stream 74 during dispensing is not installed)
Figure 10:
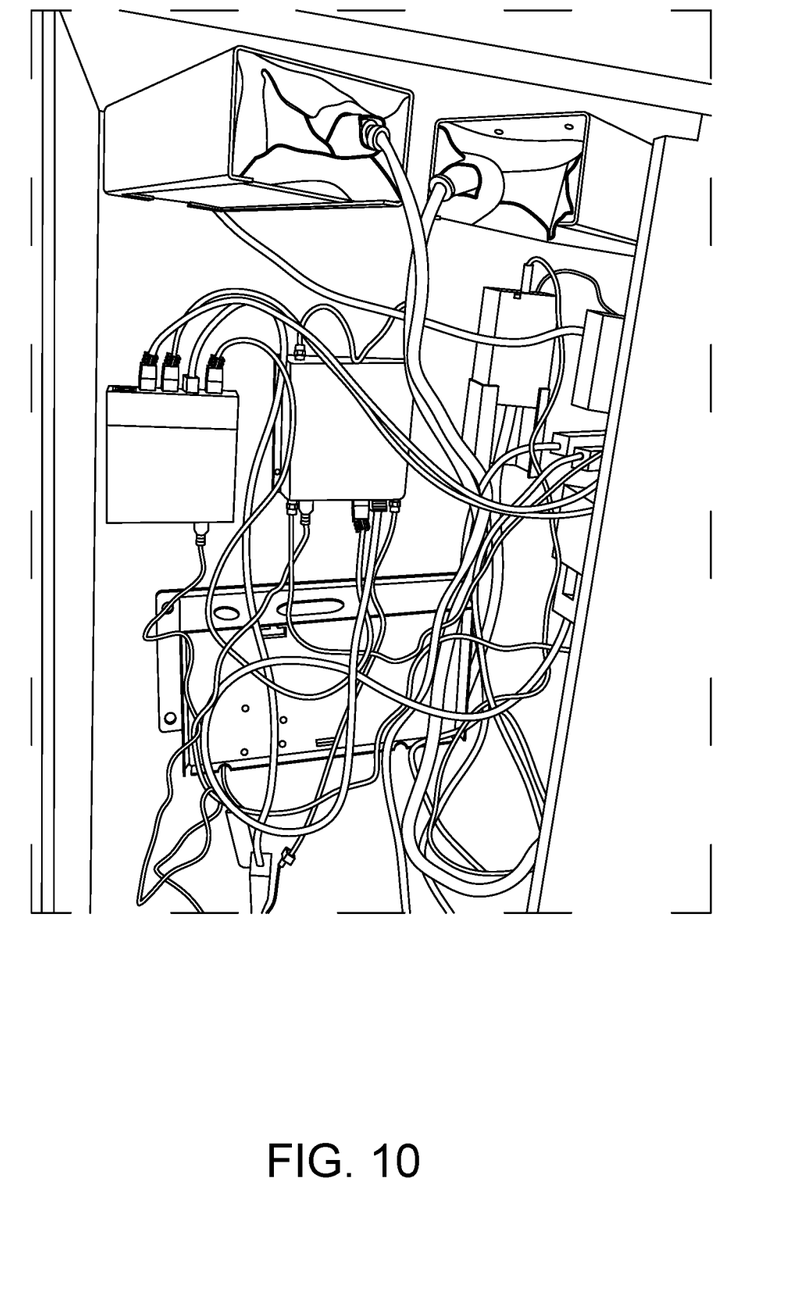
FIG. 10 is a photograph of the controller 50 for managing dispensing and connecting to the cloud. (note: wire management is not installed).

In further conjunction with FIG. 3, the integrated dispensing system provided herein provides Internet of Things (IoT) enabled operational sensors that allow for local control and remote authentication and authorization. The control hierarchy may include a hardware level; a local control level; and a remote cloud level. The hardware level may include sensors to provide input on gestures, presence of cup, detection of product flow, as well as operational status for the glycol chilling to determine proper operation of the radiator for heat exchange and circulating pump. A glycol flow detector may be utilized to provide input on glycol circulation status and speed of flow. Temperature sensors provide input and constant reading of temperature in the cooling area. The hardware level may include a touchless dispensing pump or valve to provide a means of dispensing product.

The intelligence level may include a microprocessor or controller operating at the location to combine all the inputs from the hardware level and apply logic and rules from the cloud level. The control of actual dispensing based on the rules established with controls for actual dispensing via control of the touchless dispensing Valve/Pump. Further, report all the data from and status may all be communicated to the cloud in real time via IoT.

The cloud level collects all the data from the controller in real time and analyzes data and stores for Big-Data analytics. Additionally, the cloud level may evaluates all acknowledgment and authorization rules and send alerts and notifications to appropriate users. Further, data analytics may be provided to users for reports, trends, business activities (like inventory management, etc.), provide required compliance reports (like temperature tracking for milk), or provides real time changes by users to the business rules and dispensing parameters and provisions them to the controller for real time implementation.

In operation, the present invention provides a continuously cooled tap tower that provided additional cooling to the beverage volume that remains within the tap between servings and, as such, may heat up beyond a preferred delivery temperature. The bulk beverage is maintained in a temperature-controlled housing. The temperature of the tap dwell volume is then maintained through a closed loop hydraulic circuit that removes intruded heat from within the housing and maintains the beverage delivery line within the tap tower and the beverage keg both at the same desired temperature. The cooling loop circulates through the dispensing tower in parallel with a beverage dispensing line and is re-circulated through a water-cooling radiators. Configuration and adaptation cooling radiators and reservoir cooling pumps intended for computer and data server cooling applications provides for improvements to fixed or portable automated beverage dispensing systems that allow for the cooling of the beverage retained within the tap towers within a desired temperature range applicable to the beverage being delivered in a manner that minimize space and weight and other operational issues, such as, inter alia, maintenance, reliability, modular repairability, etc. In operation, beverage dispensing system may be equipped with a proximity sensor described above so as to allow a guest or service staff to start and stop dispensing of a single serving of a beverage by placing their hand close to the sensor. However, to allow a touchless control of an advanced beverage dispensing system, the sensors should be able to recognize and process an expanded set of command or physical gestures.

Equipping a beverage dispensing system with multiple proximity sensors will allow it to recognize different hand gestures. By way of example, and not meant as a limitation, such gesture example may include and of the following:

1. Left hand is placed in front of sensors
2. Right hand is placed in front of sensors
3. Both hands are placed in front of sensors
4. First left and then right hand are placed in front of sensors
5. First right and then left hand are placed in front of sensors
6. A hand is moved from left to right
7. A hand is moved from right to left If the computer analyzing the readings from proximity sensors identifies one of these gestures it will initiate an appropriate action in beverage dispensing system.

For flowable liquids or non-Newtonian fluids, a product metering mechanism may include a metering chamber that functions as a line pressure powered bi-directional dispenser by redirecting the pressure from one end of the chamber to the other end. Such a chamber allows for accurate, repeatable metering, utilizing and preserving line pressure without the inclusion of an additional pumping device. Where additional pumping devices are required, such a metering mechanism may be utilized in series to provide for accurate and repeatable monitoring to provide a unique quality and quantity control can be easily accomplished, tracked, and reported.

With the product soured and metered, a point of delivery dispensing may thereafter be provided in a non-contact manner. Based on two (or more) sensors operating simultaneously to identify dispensing event from a touchless dispenser for beverages or non-Newtonian fluid foodstuffs, a tap tower may include a spigot having at least one non-contact sensor affixed to or within the body of the tap tower. The sensor may be adapted to identifying objects and is further adapted to filter out movements that are not interpreted as a request for dispensing. A microprocessor analyzing the data from the non-contact sensor determines when an actual request for dispensing is received. Once the request for dispensing is confirmed the spigot operationally delivers the beverage or non-Newtonian fluid foodstuff. Operation of the non-contact sensor provides both sending a pulsed signal and receiving the pulsed signal reflected from an object located in the path of the emitted signal. The microprocessor measures the time that elapses between initiation of the pulse and receipt of the reflection and uses this time delay to calculate the distance between the non-contact sensor and the object.

According to another aspect of the present invention, the pulsed signal may consist of high frequency ultrasound pulses. According to other aspects of the present invention, the pulsed signals may be infrared or electromagnetic radiation.

In order to differentiate between valid requests for dispensing and other activity in the vicinity of the touchless dispenser, a target area is identified where potential requests for dispensing are considered. Movements of a targeted object within the target detection area are then detected and the amount of time is calculated where the targeted object spends inside the detection area. Detection of the targeted object in a stable position within the detection zone for a predetermined amount of time can then be used to trigger the dispenser.

The dispensing, metering, delivery and reporting of dispensed product is thereby authenticated, authorized and controlled through distributed cloud-based control through a wide area network. By providing sensor inputs from each of the main system points (i.e., supply, metering, dispensing), delivery and control is ultimately determined through a cloud-based authentication and authorization system. By maintaining a higher level control, individual system operations may be governed and controlled by a centralized rules engine to approve or deny dispensing request (whether due to age verification or other metric), control charges and costs, as well monitor, report and alert system operations. By integrating operational sensors from each part of the system, failure of any sensor input or contradicting sensor inputs can be analyzed to allow the system to continue operations using various 'back up' control algorithms.

According to one aspect of the present invention, a dispensing system and method of operation is provided that may be adapted for general product dispensing in which system operation sensor are available from the product supply, through the product metering, to product discharge. Utilizing parallel data inputs, the operation of the system may be controlled utilizing set operational rules intended to identify normal system operation from an error mode and thereby allow continued, accurate operation even during failure of part of the system. Authentication and authorization are manages through a cloud based server in which payments may be processed and data management may be maintained with separate customer and operations databases. Authorization requests from a user at a point of purchase may be transmitted to authentication and authorization server in order to verify and validate a user and process a payment request. The request approval or denial is transmitted to the cloud-based rules engine for comparison of the request with the system operation. If one or more services are authorized the system will initiate dispensing, with a completed serving or serving failure/timeout being communicated to the cloud based rules engine for additional control (i.e., post a charge for successful dispensing, alert an error if a failure, etc.) Progress may be updated at the system or otherwise online from a portable electronic device.

By separating and distributing the system status, the user and system authorization data, and the control functions, operations may be monitored and controlled about multiple dispensing divided about separate geographic locations (if desired). In such a method operational rules that are separate for different geographic locations, operational time periods or with ambulatory or mobile customers may be aggregated.

According to another aspect of the present invention, a dispensing system and method of operation is provided that may be adapted for use with currently available gratis commodities such as milk or creamer at a coffee shop or catsup, mustard or other condiments at a stadium or similar large venue.

In addition to expanding the set of actions that beverage dispensing systems perform in response to hand gestures, utilizing multiple proximity sensors and recognizing complex hand gestures will allow eliminating or substantially reducing a number of false positive identifications of serving requests.

As an alternative to proximity sensors controlling touchless beverage dispensing systems, video cameras can also be used. By analyzing images from the camera, a computer controlling a beverage dispensing system (or an additional specialized computer) can recognize a wide variety of hand gestures and initiate appropriate actions by the beverage dispensing system. Technology for analyzing images of hand gestures from the video feed is described in numerous research papers and patents; however, to date such technology is used mostly for controlling computers or video games.

In addition to hand gestures described above, analyzing images would allow to identify many other hand gestures, such as:
1. Closed first
2. A first with thumb up
3. A first with a thumb down
4. Okay sign
5. Peace sign
6. Vulcan salutation Other technologies for controlling computers may be utilized in touchless beverage dispensing systems, such as, for example, a mouse cursor control system based on identifying hand gestures from a video feed. Beverage dispensing system in this case will be equipped with a table showing a set of icons corresponding to different beverages and serving sizes. By controlling the cursor on the tablet with movements of their hand a guest will be able to select remotely a desired option and initiate beverage dispensing.

The above described best mode for carrying out the invention is presented in terms of its preferred embodiment and is intended to be utilized as an improvement to existing keg coolers. It should be understood that such an improved chilled tap tower may be used with any beverage dispensing system, automated or manual, metered or un-metered, and that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. By way of example, and not meant as a limitation, the present improved chilled tap tower may be utilized by itself, without metering, in conjunction with a refrigerator that houses beverages and keeps them cold but would otherwise include a tap tower that cannot be chilled by forced air due to location or design of the tower. Such installations do not currently allow for traditional cooling due to the size and space of the equipment or cannot be chilled via traditional water cooling that requires a bucket in the refrigerator to keep water cold, and circulate via large pumps. In contrast, the present invention utilizes a close system recirculating pump, originally designed for CPU cooling in powerful computer systems, so the pump is very small and designed for extended and continuous operation.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A dispensing system for beverages or non-Newtonian fluid foodstuffs comprising:
   a liquid beverage source or supply;
   a product metering mechanism, wherein said product metering mechanism comprises a metering chamber enclosing a piston that functions as a line pressure powered bi-directional dispenser by redirecting the pressure from one end of the chamber to the other end;
   a delivery dispenser, wherein the delivery dispenser is in fluid communication with the product metering mechanism and provides for point of delivery dispensing may thereafter be provided in a non-contact manner and further comprises at least one sensor for identifying a dispensing event from a touchless tap for beverages or non-Newtonian fluid foodstuffs, said at least one sensor further adapted to identifying movement of objects and filter out movements that are not interpreted as a request for dispensing; and
   a control system for operatively controlling dispensing, metering, delivery and reporting of dispensed product, wherein said control system comprises a microprocessor or controller operating local to the system to combine all the inputs from a hardware level and apply remote logic and rules from a cloud level, whereby authentication, authorization and control operation are distributed in a cloud based control through a wide area network.

2. The dispensing system of claim 1, wherein said liquid beverage source or supply comprises a bulk dispensed, pressurized supply utilizing line pressure to providing a dispensing urging force.

3. The dispensing system of claim 1, wherein said liquid beverage source or supply comprises a pump in fluid communication between the beverage source or supply, the product metering mechanism and the delivery dispenser.

4. The dispensing system of claim 1, said control system further comprises:
   a hardware level comprising a plurality of Internet of Things (IoT) enabled operational sensors in operational communication with the control system and comprising:
      at least one sensor to identify a user gesture;
      at least one sensor to identify a presence of cup; and
      at least one sensor to detect a flow of beverage.

5. The dispensing system of claim 4, wherein said plurality of Internet of Things (IoT) enabled operational sensors further comprise:
   at least one sensor to identify a speed or flow of coolant; and
   at least one sensor to identify a temperature reading of the liquid beverage source or supply.

6. The dispensing system of claim 5, wherein said plurality of Internet of Things (IoT) enabled operational sensors further comprise:
   at least one sensor to identify a speed or flow of coolant; and
   at least one sensor to identify a temperature reading of the liquid beverage source or supply.

7. The dispensing system of claim 6, wherein said cloud level collects data from the controller in real time to evaluate acknowledgment and authorization rules for alert and notifying users.

8. The dispensing system of claim 1, further comprising:
   a refrigerated volume for storing at least one beverage keg;
   said delivery dispenser further comprising a tap tower for supporting at least one spigot in fluid communication with the at least one beverage keg; and
   a temperature control system for maintaining a discharge dwell volume of beverage between the at least one beverage keg and the at least one spigot at a selected depressed temperature by removing heat flux that is generated from outside the tap tower and migrating inward.

9. The dispensing system of claim 8, wherein said temperature control system comprises a closed loop cooling circuit utilizing:
   a pump,
   a discharge conduit,
   a return conduit, and
   a heat exchanger,
all in continuous operational fluid communication among each other.

10. The dispensing system of claim 9, wherein said pump includes a hydraulic reservoir integrated within the pump to provide for continuous priming and suction to facilitate pumping coolant through at least one heat exchange assembly discharging heat from coolant passing through a cooling apparatus, and the pump being a field-replaceable unit which is external to and coupled in fluid communication with the at least one heat exchange assembly.

11. The dispensing system of claim 10, wherein said heat exchanger comprises a utilizing a food water cooling radiator grade propylene glycol as a cooling fluid with the closed loop, the water cooling radiator being a field-replaceable unit which is external to and coupled in fluid communication with the pump.

12. The dispensing system of claim 9, wherein said heat exchanger comprises a utilizing a food water cooling radiator grade propylene glycol as a cooling fluid with the closed loop, the water cooling radiator being a field-replaceable unit which is external to and coupled in fluid communication with the pump.

13. The dispensing system of claim 1, further comprising:
   a touchless dispensing tap supported on a tap tower in fluid is in communication with and for the dispensing of the beverage fluid, said touchless dispensing tap adapted to initiate a beverage pour control system through pushbutton or other automated type of control.

14. The dispensing system of claim 13, further comprising:
   a tap tower including a spigot;
   at least one non-contact sensor affixed to or within a body of the tap tower and adapted to identifying objects and further adapted to filter out movements that are not interpreted as requests for dispensing;
   said controller adapted for analyzing data from the non-contact sensor and determining when an actual request for dispensing is received;
wherein once the request for dispensing is confirmed the spigot operationally delivers the beverage or non-Newtonian fluid foodstuff.

15. The dispensing system of claim 14, wherein an operation of said non-contact sensor comprises:
   sending a pulsed signal; and
   receiving the pulsed signal reflecting from an object located in a path of an emitted signal;
whereby the controller measures a time that elapses between initiation of a pulse and receipt of a reflection is received such as to calculate a distance between the non-contact sensor the object.

16. The dispensing system of claim 15, wherein said pulsed signal is select from a group consisting of: high frequency ultrasound pulses; infrared radiation; and electromagnetic radiation.

17. A method for dispensing from a dispensing system of claim 15, said method comprising:
   identifying a target area where potential requests for dispensing are considered;
   detecting movements of a targeted object within the target area;
   determining an amount of time that the targeted object spends inside the detection area; and
   identifying a stability of a position of the targeted object.

18. The method of claim 17, wherein the target area comprises a three-dimensional space represented by a truncated cone such that the distance between the at least one video sensor and the targeted object is between the cone's axis and the cone's slanted heights about a defined width.

19. The method of claim 18, wherein the targeted object comprises a hand gesture.

20. The method of claim 19, wherein said hand gesture is selected from a group comprising: a closed fist; a first with thumb up; a first with a thumb down; an "okay" sign; a peace sign; and a Vulcan salutation.

* * * * *